(12) United States Patent
Bowen

(10) Patent No.: US 12,630,070 B2
(45) Date of Patent: May 19, 2026

(54) TIE DOWN COVER SYSTEM

(71) Applicant: Aaron Bowen, Herriman, UT (US)

(72) Inventor: Aaron Bowen, Herriman, UT (US)

( * ) Notice: Subject to any disclaimer, the term of this patent is extended or adjusted under 35 U.S.C. 154(b) by 370 days.

(21) Appl. No.: 18/377,361

(22) Filed: Oct. 6, 2023

(65) Prior Publication Data

US 2025/0115179 A1    Apr. 10, 2025

(51) Int. Cl.
  *B60P 7/08*        (2006.01)
(52) U.S. Cl.
  CPC ................................. *B60P 7/0869* (2013.01)
(58) Field of Classification Search
  CPC ...................................................... B60P 7/0869
  See application file for complete search history.

(56) References Cited

U.S. PATENT DOCUMENTS 5,557,802 A * 9/1996 Wickert ............. A41D 13/0153
                                                                 2/463
7,258,516 B1 * 8/2007 Collins ................ B60P 7/0823
                                                                 410/99
8,056,189 B2 * 11/2011 Dohse .................... B66C 1/122
                                                                 24/1
10,154,722 B2 * 12/2018 Tian ...................... F41C 33/002
2017/0057398 A1 * 3/2017 Duffin .................... B60P 7/083

* cited by examiner

*Primary Examiner* — Jonathan Malikasim
(74) *Attorney, Agent, or Firm* — Lyman Moulton, Esq.; Moulton Patents, PLLC

(57)        ABSTRACT

The Strap Sleeve is the only product of its kind that fits over tie-down straps on trailers and trucks, provides an extra layer of security and prevents loose materials from flying off vehicles during transit. This unprecedented product is uniquely designed to fit most standard tie-down straps, making it compatible with a wide range of trailers and trucks while its user-friendly design allows for quick and effortless installation, saving valuable time for profession drivers or support teams tasked with preparing cargo. A tie down system including a tie down strap having a length dimension and a width dimension, a padding configured to the dimensions of the tie down strap and have a thickness dimension designed to conform to an item(s) being tied down, and a sleeve designed to receive the padding and have a slot therein to receive the tie down strap.

11 Claims, 3 Drawing Sheets

TIE DOWN COVER SYSTEM

BACKGROUND

Loose materials on trailers and trucks pose a significant safety risk to both drivers and other vehicles on the road. Moreover, the traditional practice of securing loads with tie-down straps can be time-consuming and challenging, requiring multiple adjustments Even after securing loads with traditional straps, they are susceptible to product movement and the dangers that may cause. There have been no products available as original equipment or as an aftermarket to address this problem.

An apparatus that secures is not being met by any known device or system at present. There have been no products available as original equipment or as an aftermarket to address this problem either.

SUMMARY OF THE INVENTION

The main purpose of the Tie Down Cover System is to provide users with an improved cargo strap that facilitates securing and protecting materials during transportation on a trailer.

A tie down system including a tie down strap having a length dimension and a width dimension, a padding configured to the dimensions of the tie down strap and have a thickness dimension designed to conform to an item(s) being tied down, and a sleeve designed to receive the padding and have a slot therein to receive the tie down strap.

Figure 1:
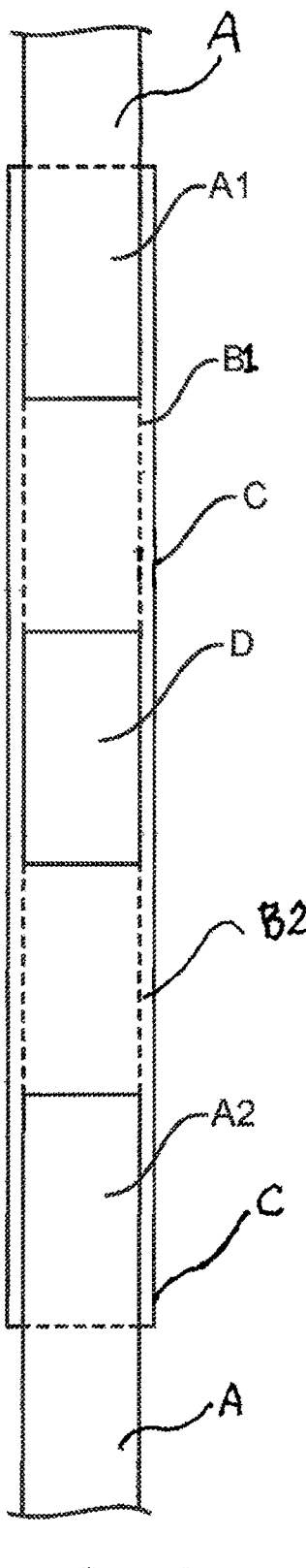
FIG. 1 is a top elevational view of the Tie Down Cover System in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a top elevational view of the Tie Down Cover System in accordance with an embodiment of the present disclosure. The view includes a tie-down strap referenced as A, overlap portion of the strap A1 on the sleeve C, slot B1 and B2 portions having the strap A inside, foam padded backing D outside the sleeve C, in accordance with an embodiment of the present disclosure.

Figure 2:
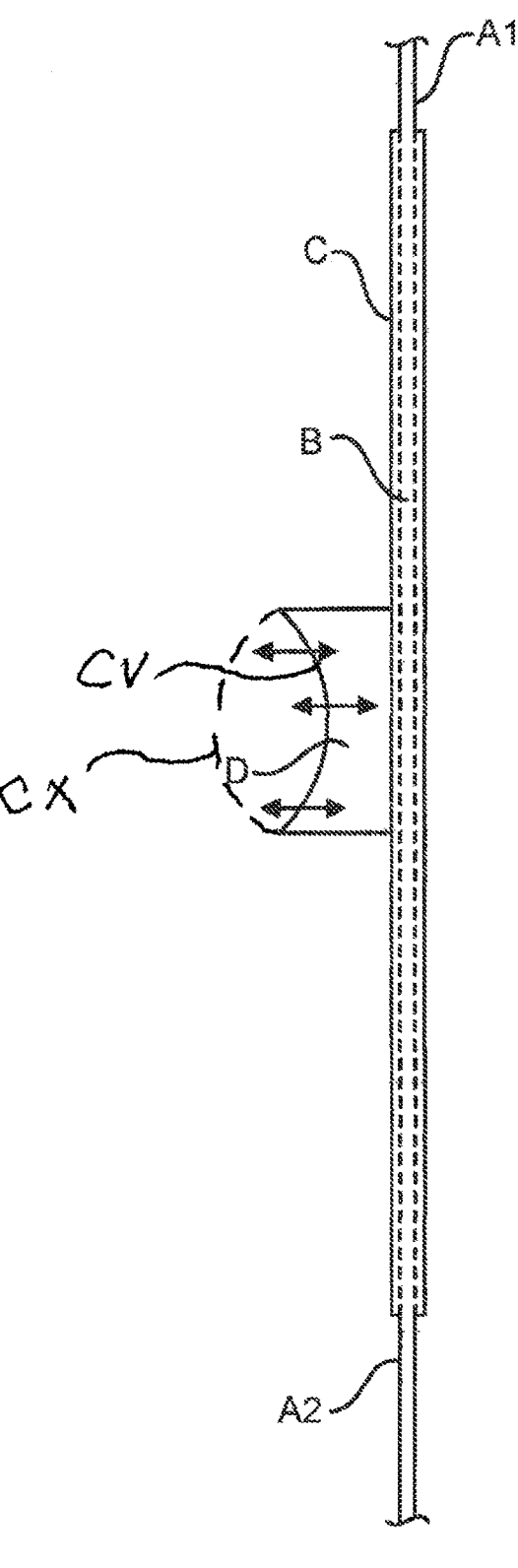
FIG. 2 is a side view of the Tie Down Cover System in accordance with an embodiment of the present disclosure.

FIG. 2 is a side view of the Tie Down Cover System in accordance with an embodiment of a present disclosure. The view includes the tie down strap ends A1 and A2, the slot B, the sleeve C and the foam pad backing D outside the sleeve C. An article receiving surface CV of the foam pad backing or also known as padding comprises a concave surface. Embodiments of the padding D outside the sleeve C comprise a convex receiving surface CX configured to receive complementary articles.

Figure 3:
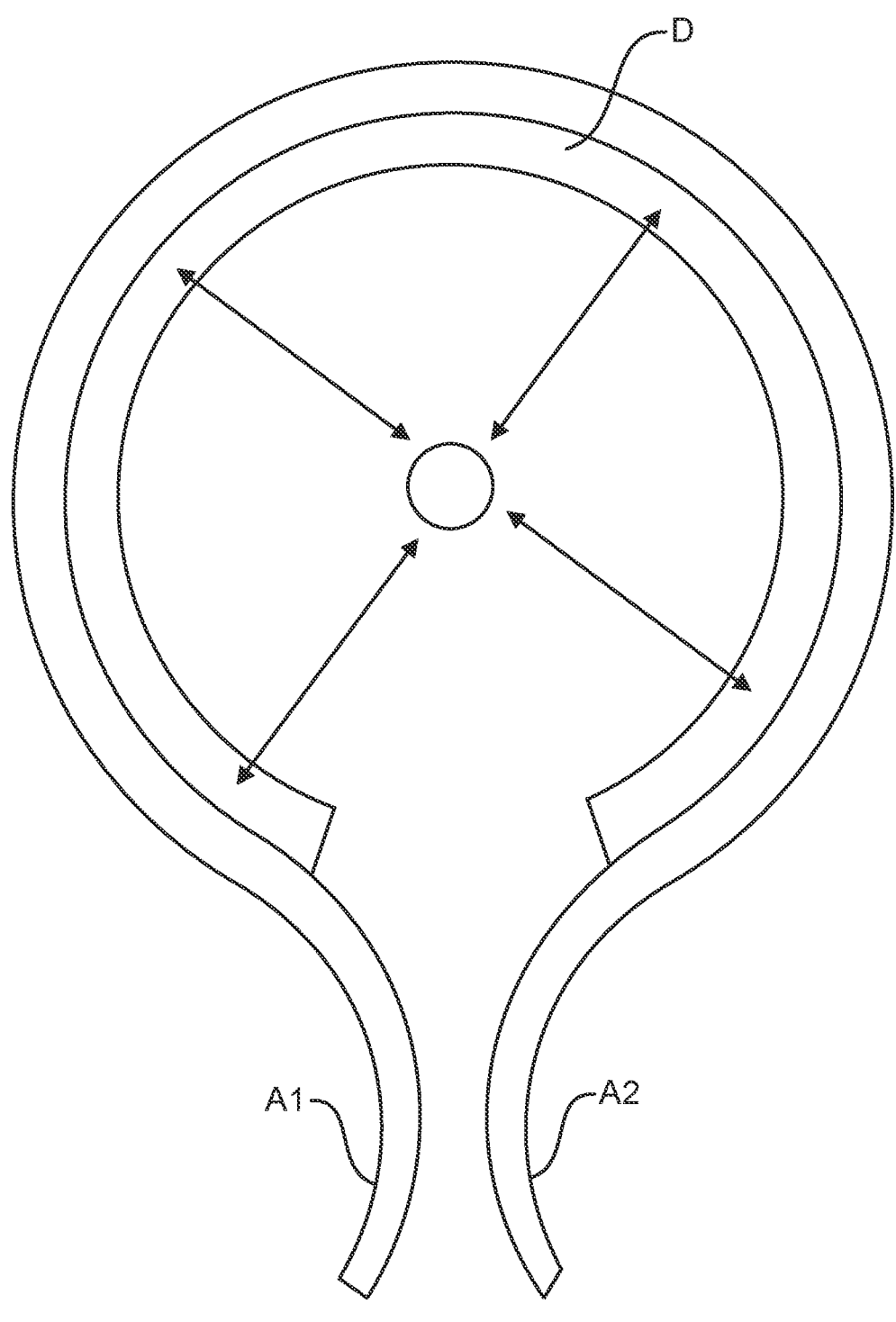
FIG. 3 is a cutaway view of the Tie Down Cover System in a circular configuration in accordance with an embodiment of the present disclosure.

FIG. 3 is a cutaway view of the Tie Down Cover System in a circular configuration in accordance with an embodiment of the present disclosure. The sleeve C and the slot B are not included for diagrammatic purposes. The foam pad backing D is shown inside the tie down strap A as if a pipe were wrapped in the tie down cover system.

The present disclosed the Tie Down Cover System, also known as "Strap Sleeve", offers a modern accessory that ensures more secure loads, distributes pressure evenly, and minimizes the risk of damage to cargo during transport. Expanding on the initial design of an average tie-down strap, the Strap Sleeve introduces a novel sleeve specifically designed to fit over tie-down straps, preventing items from shifting, sliding, or flying off during transportation. The flexible foam, air, and/or other solid materials within the Strap Sleeve allows pressure to be distributed evenly along the length of the strap. This feature prevents excessive pressure on specific areas of the load, reducing the likelihood of damage to fragile or delicate items as the sleeve acts as a cushion, protecting cargo and increasing the outcome of it arriving at its destination in pristine condition. This innovative, top-quality product allows for enhanced load stability, allows for accurate pressure distribution and redefined load security by combining convenience and flexibility.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A tie down system comprising:
   a tie down strap having a plurality of dimensions comprising a length dimension and a width dimension;
   a padding configured to the plurality of dimensions of the tie down strap and have a thickness dimension; and
   a sleeve comprising an inside and an outside and configured to receive a portion of the padding inside the sleeve and a portion of the padding outside the sleeve and comprise a lengthwise slot therein configured to receive the tie down strap.

2. The tie down system of claim 1, wherein the padding is received adjacent the sleeve.

3. The tie down system of claim 1, wherein the portion of the padding outside the sleeve comprises a concave surface to cushion a spherical and a cylindrical item.

4. The tie down system of claim 1, wherein the portion of the padding outside the sleeve comprises a convex surface.

5. The tie down system of claim 1, wherein the length of the strap is greater than a length of the padding.

6. The tie down system of claim 1, wherein the length of the strap is greater than a length of the slot.

7. The tie down system of claim 1, wherein the thickness of the padding is greater than a thickness of the strap.

8. The tie down system of claim 1, wherein the slot is configured to slidingly receive the strap.

9. The tie down system of claim 1, wherein a lateral side of the sleeve is configured with a bumpy frictional surface.

10. The tied down system of claim 1, wherein all lateral sides of the sleeve are configured with a bumpy frictional material.

11. The tie down system of claim 1, further comprising a plurality of sleeves, padding and tie down straps are configured to cover the item(s) being tied down.

\* \* \* \* \*